(12) United States Patent
Lager

(10) Patent No.: US 10,775,772 B2
(45) Date of Patent: Sep. 15, 2020

(54) METHOD AND A SYSTEM FOR CONTROLLING A VELOCITY OF A CONVEYANCE PATH

(71) Applicant: ABB Schweiz AG, Baden (CH)

(72) Inventor: Anders Lager, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/341,480

(22) PCT Filed: Oct. 12, 2016

(86) PCT No.: PCT/EP2016/074404
§ 371 (c)(1),
(2) Date: Apr. 12, 2019

(87) PCT Pub. No.: WO2018/068840
PCT Pub. Date: Apr. 19, 2018

(65) Prior Publication Data
US 2019/0369600 A1 Dec. 5, 2019

(51) Int. Cl.
*G05B 19/416* (2006.01)

(52) U.S. Cl.
CPC .. *G05B 19/416* (2013.01); *G05B 2219/39106* (2013.01)

(58) Field of Classification Search
CPC ....... B25J 9/0084; B25J 9/0093; B65B 35/36; B65B 5/105; G05B 19/416;
(Continued)

(56) References Cited

U.S. PATENT DOCUMENTS

| | | | |
|---|---|---|---|
| 5,243,690 A | * | 9/1993 | Chmielewski, Jr. ... B25J 9/1697 700/259 |
| 6,122,895 A | * | 9/2000 | Schubert .................. B65B 5/12 53/240 |

(Continued)

FOREIGN PATENT DOCUMENTS

| | | |
|---|---|---|
| DE | 29701564 U1 | 3/1997 |
| EP | 1522911 A2 | 4/2005 |

(Continued)

OTHER PUBLICATIONS

International Search Report & Written Opinion of the International Searching Authority Application No. PCT/EP2016/074404 completed: Jun. 2, 2017; dated Jun. 14, 2017 11 Pages.

*Primary Examiner* — Kidest Bahta
(74) *Attorney, Agent, or Firm* — Whitmyer IP Group LLC

(57) ABSTRACT

A method for controlling a velocity of a conveyance path of a system including an industrial robot, a first conveyance path configured to transfer items within a working area (b2) of the robot with a velocity $v_1$, and a second conveyance path configured to transfer empty places within the working area (b2) of the robot with a velocity $v_2$. The method includes: obtaining position data for a plurality of items and for a plurality of empty places; creating one or more pairs including one of the empty places of the plurality of empty places and a respective item of the plurality of items; calculating, for one of the one or more pairs, a time $t_{As}$ for the empty place of the one pair and a time $t_{Bk}$ for the item of the one pair to reach a border of the working area (b2) based on position data for the one pair and the velocities $v_1$ and $v_2$; and controlling the velocity $v_2$ of the second conveyance path based on a difference between the time $t_{As}$ and a time ($t_{Bk}+\Delta t$), where $\Delta t$ is a predetermined time difference.

19 Claims, 3 Drawing Sheets

(58) Field of Classification Search
CPC ...... G05B 19/4182; G05B 2219/39101; G05B 2219/39106; G05B 2219/40037; Y02P 90/083

See application file for complete search history.

(56) References Cited

U.S. PATENT DOCUMENTS

| | | |
|---|---|---|
| 6,826,444 B2 | 11/2004 | Herzog |
| 6,901,726 B2 | 6/2005 | Huppi et al. |
| 8,565,912 B2 | 10/2013 | Wappling et al. |
| 8,905,222 B2 | 12/2014 | Worz |
| 8,948,907 B2 | 2/2015 | Ugarte Barrena et al. |
| 8,997,438 B1 * | 4/2015 | Fallas ................ B65G 47/914 414/222.01 |
| 2003/0108415 A1 * | 6/2003 | Hosek .................. B25J 9/1664 414/783 |
| 2012/0029507 A1 * | 2/2012 | Kimura .............. A61B 18/1445 606/41 |
| 2012/0165972 A1 * | 6/2012 | Wappling ............... B25J 9/1687 700/213 |
| 2014/0123606 A1 | 5/2014 | Ehrat |
| 2014/0265111 A1 * | 9/2014 | Ishizuka ................ H02P 23/22 271/265.01 |
| 2015/0134110 A1 * | 5/2015 | Koyanagi ............... B25J 9/0084 700/248 |
| 2016/0107781 A1 * | 4/2016 | Hutter .................... B65B 21/18 53/467 |

FOREIGN PATENT DOCUMENTS

| | | |
|---|---|---|
| EP | 2233400 A1 | 9/2010 |
| WO | 2011029476 A1 | 3/2011 |

* cited by examiner

METHOD AND A SYSTEM FOR CONTROLLING A VELOCITY OF A CONVEYANCE PATH

TECHNICAL FIELD

The present disclosure relates to the field of industrial robots, and to systems including conveyors and to methods for controlling the velocity of such conveyors. In particular, the disclosure relates to a system and a method for controlling a velocity of a conveyance path.

BACKGROUND

Automation of picking and placing objects by using industrial robots is well known. In a multi robot picking system, items and empty places are often moved by conveyors passing by the robots. Items can be picked and empty places can be filled while they are inside a robot's working range. Each robot receives information about new pick and place locations continuously during the picking process, e.g. retrieved by a camera.

The robots are normally operating independently. For every pick and place to be performed by a robot, a decision is taken in runtime which item that shall be picked or which empty place location that shall be filled. The decision is made among available items and empty places currently within reach by the robot. To make the robot work efficiently, it is important that matching items and empty places are available within reach at the same time.

The work load of an incoming flow of items or empty places can be shared between the robots. The incoming flow may be fluctuating or predefined, and the robots may share the work load. A fixed percentage of the items or empty places may be assigned to each robot. Alternatively, all items and empty places are assigned to all robots. If an item is picked, or an empty place is filled, by one robot, it becomes cancelled by the downstream robots.

A common system setup is to have two parallel conveyors passing multiple robots, wherein one of the conveyors is an item conveyor where items to be picked are transported, and one conveyor is an empty place conveyor where empty places are transported. The conveyors can move in the same direction i.e. concurrent flows, or they can move in opposite directions, so called counter flows. Typically, the velocity of the item conveyor cannot be affected by the system as it has a velocity that is predetermined and adapted to the amount of items it is transporting. However, the velocity of the empty place conveyor can often be affected or directly controlled by the system.

It is often desirable that all place locations are filled before passing by the last robot. It is also desirable that all incoming items are picked before passing by the last robot. Counter flow makes these combined tasks easier to achieve, due to the fact that the most upstream robot in respect of the picking flow has an overflow of incoming items that can be used to fill the remaining empty places. And the most upstream robot in respect of the empty place flow has an overflow of empty places that can be used to place the remaining items. In a parallel flow where both conveyors move in the same direction it is harder to achieve both tasks. The task of filling all place locations can be achieved e.g. by having a start/stop control of the empty place conveyor at the most downstream robot. The most downstream robot will stop the empty place conveyor if there is a risk that any empty place cannot be filled in time. However, it is hard to guarantee that also all items are picked unless the inflow of empty places and items are actively balanced and the velocities of the conveyors are similar, see for example U.S. Pat. No. 6,122,895 A.

When the conveyor velocities of the two conveyors need to be different e.g. due to a different density of items and empty places, there is a high probability that the most downstream robot now and then will have items available to pick but no empty places to fill, causing an overflow on the item conveyor. This problem can be solved e.g. by having a buffer of stationary empty places next to the robots. The buffer will be filled when no empty places are within reach on the empty places conveyor, and picked from when no items are within reach on the item conveyor. However, using a buffer will reduce the efficiency of the system since extra time is spent on moving items to and from the buffer.

US2014/0123606A1 describes a method and device for inserting individual products into containers in an automated line. An empty container is guided by the container supply as soon as a number of individual products corresponding to the number of products needed to fill a container are transported on the product belt.

SUMMARY

It is an object of the present disclosure to provide a method that improves the performance of a robot picking and placing system. It is a particular object of the disclosure to provide a method that reduces an overflow of the system.

These objects and others are at least partly achieved by the method and the system according to the independent claims, and by the embodiments according to the dependent claims.

According to a first aspect, the disclosure relates to a method for controlling a velocity of a conveyance path of a system including an industrial robot. The system includes a first conveyance path configured to transfer items within a working area of the robot with a velocity $v_1$, and a second conveyance path configured to transfer empty places within the working area of the robot with a velocity $v_2$. The method includes obtaining position data for a plurality of items transferred on the first conveyance path and obtaining position data for a plurality of empty places transferred on the second conveyance path. The method further includes creating one or more pairs including one of the empty places of the plurality of empty places and a respective item of the plurality of items and calculating, for one of the one or more pairs, a time $t_A$ for the empty place of the one pair and a time $t_B$ for the item of the one pair to reach a border of the working area based on position data for the one pair and the velocities $v_1$ and $v_2$. The method also includes controlling the velocity of the second conveyance path based on a difference between the time $t_A$ and a time $(t_B+\Delta t)$, where $\Delta t$ is a predetermined time difference.

With the proposed method the performance of the system can be improved, as the possibility of having an empty place for each item within the working area of the robot is increased. Thus, then the possibility that the robot will have time to place all items, and does not have to wait for an empty place when there are available items to pick is increased. The robot stand still time may thus be decreased.

The method may be implemented to an already existing system, e.g. a picking system, and it is easy to use, to explain and to understand. The chance that a last robot always receives a matching number of items and empty places at the same time is increased. The method may decrease the amount of overflow without buffer handling or decrease the need for passing any overflow of items back to an item inflow for a new chance of being handled, i.e. recycling of items.

According to some embodiments, the creating of one or more pairs includes creating one or more pairs including one of the empty places and a respective item having the same order number in the running direction in relation to the border based on the position data. According to some embodiments, the one of the empty places and the respective item are only located in the working area or upstream the working area.

According to some embodiments, the controlling includes increasing the velocity $v_2$ of the second conveyance path if the time $t_{As}$ is greater than the time $t_{Bk}+\Delta t$ for the one of the one or more pair.

According to some embodiments, the method includes to perform the calculating for up to N pairs starting from the border. If for all the N pairs the time $t_{As}$ is less than the time $(t_{Bk}+\Delta t)$, the controlling includes decreasing the velocity $v_2$ of the second conveyance path.

According to some embodiments, the N pairs starting from the border are N consecutive pairs starting from the border.

According to some embodiments, the border of the working area is the most upstream border of the working area that crosses the first conveyance path and the second conveyance path.

According to some embodiments, the border of the working area is the most downstream border of the working area that crosses the first conveyance path and the second conveyance path.

According to some embodiments, the method includes comparing a characteristic of the empty place of a pair with a limit for the characteristic indicating when the second conveyance path at latest can be stopped such that the empty place still remains within the working area of the robot, and if the characteristic of the empty place is less or equal to the characteristic limit, the controlling includes stopping or reducing the velocity of the second conveyance path.

According to some embodiments, the characteristic is the time $t_{As}$ to a most downstream border or a distance for the empty place to a most downstream border.

According to some embodiments, the plurality of items also includes any item held by the robot. The item is then held by a tool of the robot, e.g. by a gripper.

According to some embodiments, the method includes determining both a number of empty places and a number of items within the working area b2 of the robot, and increasing the velocity $v_2$ of the second conveyance path if the number of items is greater than the number of empty places.

According to some embodiments, the number of items also includes any item held by the robot.

According to a second aspect, the disclosure relates to a system including an industrial robot, a first conveyance path and a second conveyance path. The first conveyance path is configured to transfer items within a working area b2 of the robot with a velocity $v_1$ and the second conveyance path is configured to transfer empty places within the working area b2 of the robot with a velocity $v_2$. The first conveyance path and the second conveyance path further have the same running direction. The system further includes a control system including a processing circuitry configured to execute the method as described herein.

According to one embodiment, the system includes a sensor system arranged to monitor the first conveyance path and the second conveyance path in order to obtain position data.

DETAILED DESCRIPTION

Figure 1:
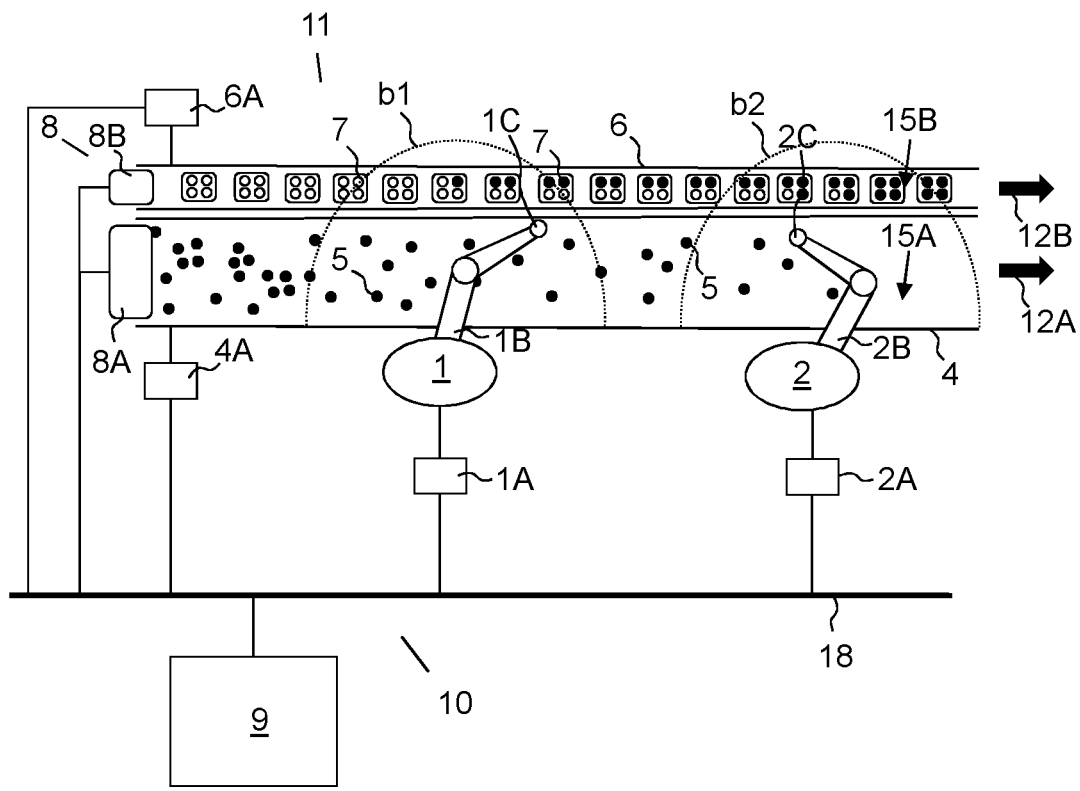
FIG. 1 illustrates a system with a plurality of industrial robots arranged along two conveyors according to one embodiment of the disclosure.

In the following a method for controlling a velocity of a conveyance path will be described, and initially an example system will be described wherein the method can be implemented. In FIG. 1 a robot system 11 with two industrial robots 1, 2 is shown. The exemplified robot system 11, hereinafter system 11, is for illustration only, and the system 11 may e.g. include more or less, but at least one, industrial robot 1, 2. An industrial robot is herein defined to be a robot that can be automatically controlled, that is reprogrammable, that can adopt to a multitude of tasks and has three or more axes. Each industrial robot 1, 2 hereinafter referred to as a robot 1, 2, is arranged with a robot controller 1A, 2A, a robot arm 1B, 2B and a tool 1C, 2C. Each tool 1C, 2C is attached to an end effector of a robot, respectively. A tool 1C, 2C may e.g. be a gripper, a suction tool or a processing tool. The robot arm 1B, 2B may be a single chain arm. The robot may have six degrees of freedom. Alternatively, the robot may be a special kind of picking robot where the arm 1B, 2B is implemented as a plurality of legs all arranged to the same tool 1C, 2C. The robot may alternatively be a dual-arm robot where each arm of the robot may be independently controlled.

As can be seen from FIG. 1, the robots are in this example system arranged along two different parallel linear conveyance paths 4, 6, i.e. a first conveyance path 4 and a second conveyance path 6. The first conveyance path 4 and the second conveyance path 6 may be conveyor devices such as belt conveyors, roller conveyors or shooter conveyors or the like with an altitude difference from an inflow side to an outflow side of the conveyor. The first conveyance path 4 and the second conveyance path 6 may be different kinds of conveyance paths. The first conveyance path 4 is running in a first direction 12A and the second conveyance path 6 is running in a second direction 12B. The first direction 12A and the second direction 12B are here the same, thus, the first direction 12A and the second direction 12B are concurrent directions. In other words, the first conveyance path 4 and the second conveyance path 6 have the same running direction. The first direction 12A and the second direction 12B may however in some other embodiments not be parallel. The first conveyance path 4 is arranged with a first plane 15A for carrying items 5. The second conveyance path 6 is arranged with a second plane 15B for carrying empty places 7, such as containers with empty places 7. When arranged along the first conveyance path 4 and the second conveyance path 6, the robots may be referred to as a first robot 1 being the most upstream robot, and a last robot 2 being the most downstream robot of the depicted robots, in relation to the common direction of the first conveyance path 4 and the second conveyance path 6. Each robot is capable of working within a working area, typically formed as a globe around the robot and here schematically depicted as a semi-circle b1, b2 in the first plane 15A and the second plane 15B of both of the first conveyance path 4 and the second conveyance path 6. Thus, the first robot 1 is arranged to work within a first working area b1, and the last robot 2 is arranged to work within a second working area b2. The first working area b1 and the second working area b2 may be defined within an area restricted by the positions that the robot tool 1C, 2C of the respective robot can reach in space by moving the arm 1B, 2B of the robot. The first working area b1 and the second working area b2 may thus be defined to be the whole area that the respective robot can reach with its robot tool 1C, 2C, or be defined to be a smaller, reduced area within this whole area. A smaller area may be useful, e.g. if the movements of the robot have to be limited temporarily or constantly, e.g. not to collide with any adjacent robot or structure. The first conveyance path 4 is configured to transfer items 5, e.g. a plurality of items 5, within the first working area b1 and the second working area b2 with a velocity $v_1$. The second conveyance path 6 is configured to transfer empty places 7, e.g. a plurality of empty places 7 for the items 5, within the first working area b1 and the second working area b2 with a velocity $v_2$.

A first conveyance path controller 4A is arranged to control a motor (not shown) of the first conveyance path 4 based on input data to the first conveyance path controller 4A, in order to control the velocity $v_1$ and running direction of the first conveyance path 4. A second conveyance path controller 6A is arranged to control a motor (not shown) of the second conveyance path 6 based on input data to the second conveyance path controller 6A, in order to control the velocity $v_2$ and running direction of the second conveyance path 6. Input data with instructions for setting the velocity and running direction of the respective conveyance path 4, 6 may be determined and generated by the robot control system 10, and sent to the conveyance path controllers 4A, 6A, respectively. The velocities and running directions of the conveyance paths 4, 6 may be set in advance to nominal values. The movement of a conveyance path 4, 6, e.g. the velocity and running direction, may be monitored by the robot control system 10 by receiving input from an encoder (not shown) arranged to the conveyance path 4, 6, respectively.

Figure 2:
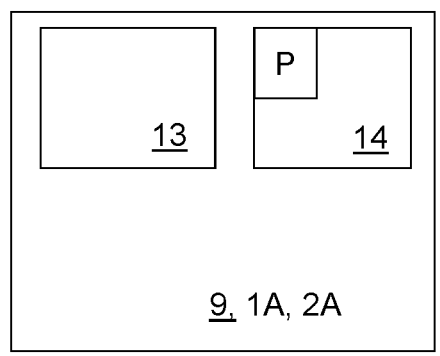
FIG. 2 illustrates a master controller according to one embodiment.

In FIG. 2 a robot controller 1A, 2A and/or a master controller 9 is illustrated. Each robot controller 1A, 2A and the master controller 9 includes a respective processor 13 and a respective memory 14. The processor 13 may be made up of one or several CPUs (Central Processing Units). The memory 14 may be made up of one or several memory units. Each robot controller 1A, 2A may be arranged to control a robot according to input data to the robot controller 1A, 2A indicating a position of an item 5 on the first conveyance path 4, and/or a position of an empty place 7 on the second conveyance path 6. In response to the input data, the robot controller 1A, 2A is arranged to execute a computer program P and generate control signals to the various actuators of the respective robot such that the tool 1C, 2C of the robot handles the item 5 or empty place 7, e.g. picks, processes or releases an item 5 at the position.

In some embodiments, the robot system 11 includes a sensor system 8 arranged to determine the positions of the items 5 and the empty spaces 7 in a hitherto known manner. The sensor system 8 may be arranged to monitor the first conveyance path 4 and the second conveyance path 6, in order to determine position data of the items 5 on the first conveyance path 4 and the empty places 7 on the second conveyance path 6. The sensor system 8 may include at least one sensor item 8A arranged to monitor the first conveyance path 4 upstream the working area b1 of the first robot 1, and at least one sensor item 8B arranged to monitor the second conveyance path 6 upstream the working area b1 of the first robot 1. Alternatively, the sensor items 8A, 8B may be incorporated as one sensor item monitoring both the first conveyance path 4 and the second conveyance path 6 upstream the working area b1 of the first robot 1. A sensor item 8A, 8B may include at least one camera and/or at least one photoelectric sensor.

When the first robot 1 and the last robot 2 are sharing the same sensor system 8, a handshaking procedure between the first robot controller 1A and the second robot controller 2A may be necessary in order to inform the last robot 2 about which items 5 and/or empty places 7 that have been handled by the first robot 1. For example, if the sensor system 8 only monitors items 5 and empty places 7 upstream the first robot 1 but sends all sensor data or position data to all robot controllers 1A, 2A, then the first robot controller 1A and the second robot controller 2A are handshaking such that the second robot controller 2A knows which items 5 and empty places 7 that remain in the incoming flow to the last robot 2.

The robot system 11 of FIG. 1 includes the robot control system 10 arranged with processing circuitry for controlling the robot system 11. The processing circuitry may include the master controller 9 and/or the robot controllers 1A, 2A. The master controller 9 is arranged to receive position data from the sensor system 8. The empty places 7 may be located in one or more containers according to a predetermined pattern. If the position of one container then is known, the positions of the respective empty places 7 can also be determined by the master controller 9 or the sensor system 8 by mapping the container position with the predetermined pattern. The functionality of the master controller 9 may instead be incorporated in one of the robot controllers 1A, 2A, e.g. in the robot controller 2A of the last robot 2, or in each of the robot controllers 1A, 2A.

In FIG. 1 is also a common transmission path 18 illustrated. This transmission path 18 may be wired or wireless. The transmission path 18 illustrates that all devices, units, systems and/or controllers of the robot system 11 may be arranged to communicate with each other and to transfer data in-between each other by wire or wirelessly. The master controller 9 may be arranged to send position data, e.g. positions of items 5 and empty places 7 to at least one of the robot controllers 1A, 2A, and to receive data from the same via the transmission path 18. The master controller 9 may also be arranged to send data to the conveyance path controllers 4A, 6A and to receive data from the same.

The robot control system 10 (FIG. 1) is configured to execute a method for controlling the velocity of a conveyance path of the robot system 11, here the velocity $v_2$ of the second conveyance path 6. For example, the master controller 9 or the robot controller 2A of the last robot 2 may be configured to execute the method, and to generate control signals to the conveyance path controllers 4A, 6A. The master controller 9 or the robot controller 2A may include a computer program P with program code to cause the master controller 9, robot controller 2A or another computer connected to the master controller 9, or including the functionality of the master controller 9, to perform the method that will be explained in the following. The program code may be stored on a separate computer-readable medium, and loaded into the master controller 9 and/or the robot controller 2A.

The method will now be explained with reference to the flowchart in FIG. 5, and to the illustrations in FIGS. 1, 3 and 4. The first conveyance path 4 has been started and is transferring items 5 within the working areas b1 of the first robot 1 and within the working area b2 of the last robot 2 with the velocity $v_1$. The flow of items 5 is here fluctuating. The work load on the first conveyance path 4 may be equally balanced between the robots. The last robot 2 is however programmed to pick the last item 5 that is next to leave the working area b2 of the last robot 2, and to place the item 5 in an empty place 7 that is next to leave the working area b2 of the last robot 2.

The second conveyance path 6 has also been started and is transferring empty places 7 through the working area b1 of the first robot 1 and through the working area b2 of the last robot 2 with a velocity $v_2$. The flow of empty places 7 is here fluctuating. The first conveyance path 4 and the second conveyance path 6 have the same running direction. Alternatively, the first conveyance path 4 and the second conveyance path 6 have perpendicular, or otherwise angled, running directions. The method will here be illustrated when implemented to the last robot 2, as is also preferred. The method includes in a step A1 obtaining position data for a plurality of items 5 transferred on the first conveyance path 4. The method includes in another step A2 obtaining position data for a plurality of empty places 7 transferred on the second conveyance path 6. The position data indicates positions of the items 5 and the empty places 7, respectively. The positions may be readily available from the memory 14, sent from the sensor system 8 or determined by the robot control system 10, e.g. the master controller 9 or any of the robot controllers 1A, 2A based on sensor data from the sensor system 8. The steps A1 and A2 are performed continuously, such that the robot control system 10 continuously has access to the positions of the items 5 and the empty places 7 on the respective conveyance path 4, 6.

The method further includes in a step A3 creating, based on the position data, one or more pairs including one of the empty places 7 of the plurality of empty places 7 and a respective item 5 of the plurality of items 5. Stated differently, at least one empty place 7 is paired with a respective item 5. The one or more pairs are created among items 5 and empty places 7 that have not yet passed the working area b2 of the last robot 2 i.e. both the one of the empty places 7 and the respective item 5 are located in the working area b2 or upstream the working area b2. According to one embodiment, the creating one or more pairs includes creating one or more pairs including one of the empty places 7 and a respective item 5 having the same order number in the running direction based on the position data. The order number is determined in relation to a border 16, 17 of the working area b2, the empty place 7 and the item 5 having the shortest distance to the border 16, 17 having the order number 1. The border 16, 17 is the same border for both the empty place 7 and the item 5 of a pair, that is, either the most upstream border 16, or the most downstream border 17, of the working area b2. With the running direction is here meant the running direction of the respective conveyance path 4, 6.

The method includes in another step A4 calculating, for one of the one or more pairs, a time $t_{As}$ for the empty place 7 of the one pair (s, k) and a time $t_{Bk}$ for the item 5 of the one pair (s, k) to reach a border 16, 17 of the working area b2 based on position data for the one pair (s, k) and the velocities $v_1$ and $v_2$. "s" here indicates an order number from the border 16, 17 of the item 5 of the pair, and "k" here indicates an order number from the same border 16, 17 of the empty place 7 of the pair. The number "s" may be 1, 2, 3, 4, 5, 6, 7, 8, 9, 10 . . . 50 etc., and the number "k" may be 1, 2, 3, 4, 5, 6, 7, 8, 9, 10 . . . 50 etc. The time $t_{As}$ may be calculated by dividing the closest distance in the running direction of the second conveyance path 6 between the empty place 7 number "s" and the border 16, 17 with the velocity $v_2$. The time $t_{Bk}$ may be calculated by dividing the closest distance in the running direction of the first conveyance path 4 between the item 5 number "k" and the border 16, 17 with the velocity $v_1$.

Figure 3:
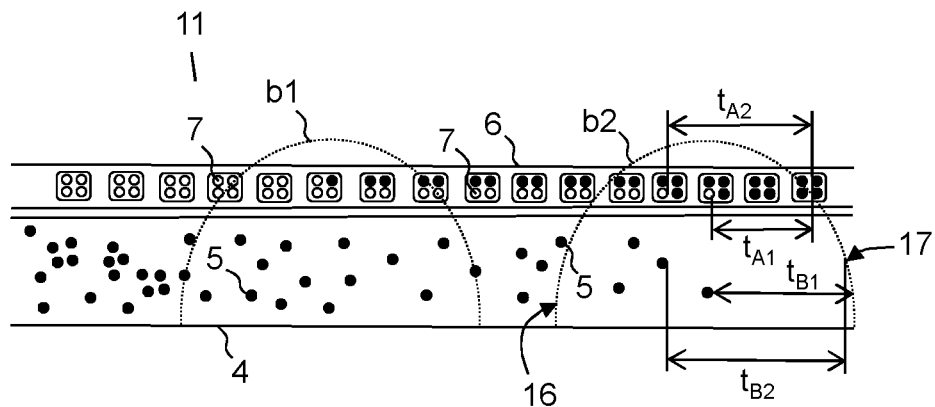
FIG. 3 illustrates the two conveyors in FIG. 1 in isolation according to one embodiment.

In FIG. 3 an example of the result of the calculation in method step A4 is illustrated. The border 16, 17 is here the most downstream border 17 of the working area b2 that intersects the first conveyance path 4 and the second conveyance path 6. In other words, the most downstream border 17 is defined by the most downstream intersection of the working area b2 with the first conveyance path 4 and the second conveyance path 6. A first pair of an item 5 and a respective empty place 7 may be created, where the item 5 is the next item 5 in turn to cross the most downstream border 17, and the empty place 7 is the next in turn to cross the most downstream border 17. In step A4, a time $t_{B1}$ for the item 5 to reach the most downstream border 17 is calculated, and a time $t_{A1}$ for the empty place 7 to reach the most downstream border 17 is calculated. The calculating may be made for up to N pairs, e.g. if N=2, the calculating is in addition to the first pair made for a second pair which is the next in turn to cross the most downstream border 17. Then, a second pair of an item 5 and a respective empty place 7 is created, where the item 5 is the second next item 5 in turn to cross the most downstream border 17, and the empty place 7 is the second next in turn to cross the most downstream border 17.

Figure 4:
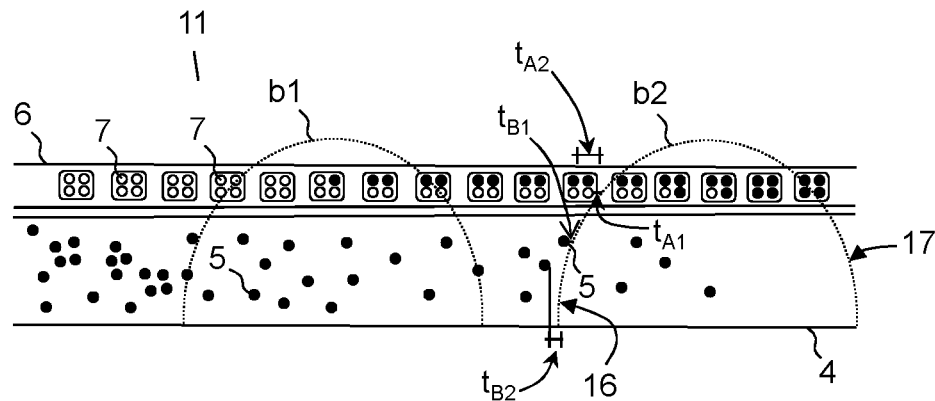
FIG. 4 illustrates the two conveyors in FIG. 1 in isolation according to another embodiment.
Figure 5:
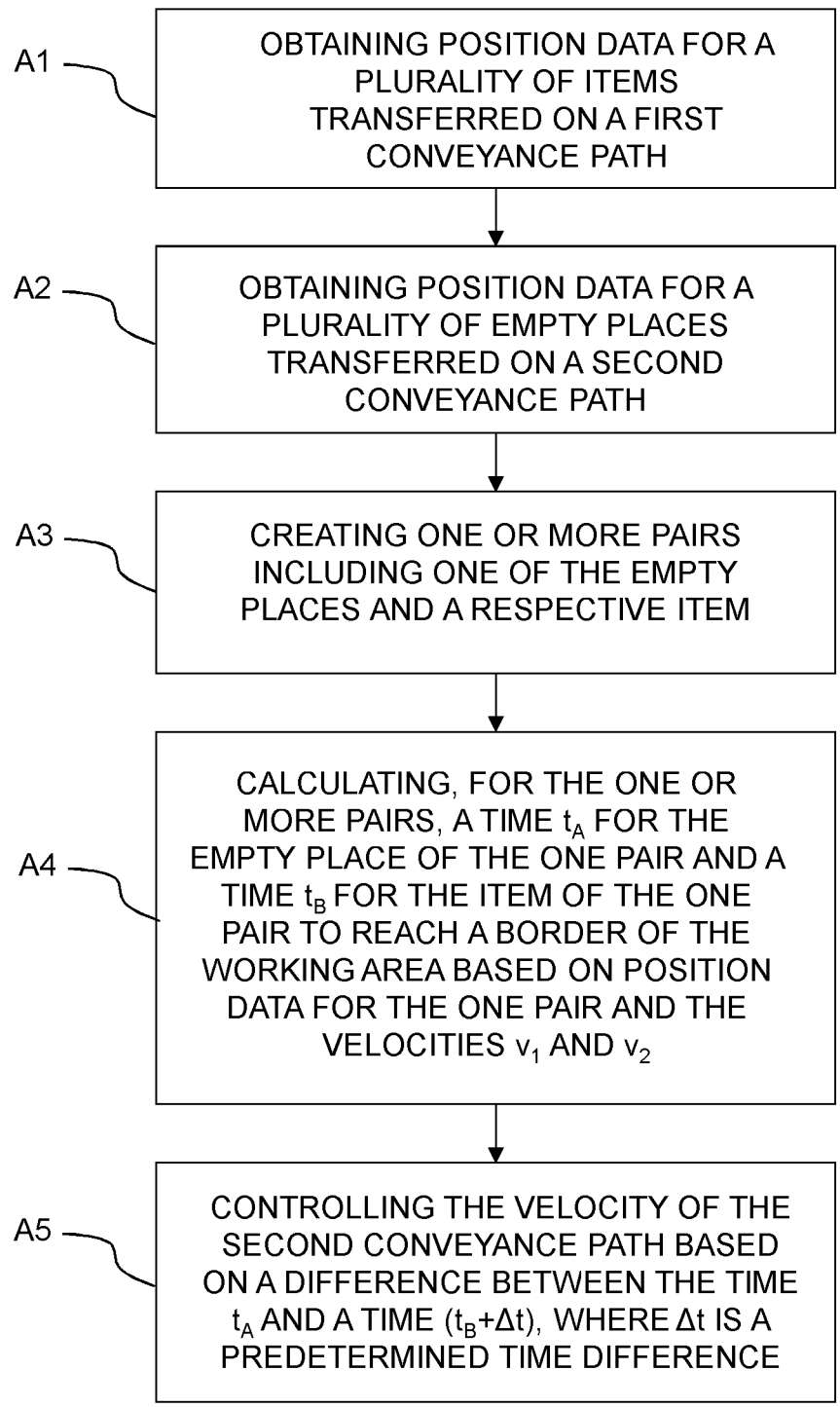
FIG. 5 illustrates a flow chart for a method according to one embodiment of the disclosure.

In FIG. 4 another example of a result of the calculation in method step A4 is illustrated. The border is here the most upstream border 16 of the working area b2 that intersects the first conveyance path 4 and the second conveyance path 6. In other words, the most upstream border 16 is defined by the most upstream intersection of the working area b2 with the first conveyance path 4 and the second conveyance path 6. A first pair of an item 5 and a respective empty place 7 is created, where the item 5 is the next item 5 in turn to cross the most upstream border 16, and the empty place 7 is the next in turn to cross the most upstream border 16. In step A4, a time $t_{B1}$ for the item 5 to reach the most upstream border 16 is calculated, and a time $t_{A1}$ for the empty place 7 to reach the most upstream border 16 is calculated. The calculating may be made for up to N pairs, e.g. if N=2, the calculating is in addition to the first pair made for a second pair, which is the next in turn to cross the most upstream border 16. Then, a second pair of an item 5 and a respective empty place 7 is created, where the item 5 is the second next item 5 in turn to cross the most upstream border 16, and the empty place 7 is the second next in turn to cross the most upstream border 16. In some embodiments, the time $t_{Bk}$ is a negative time, if the corresponding item 5 has already passed the most upstream border 16. Also, in some embodiments, the time $t_{Ak}$ is a negative time, if the corresponding empty place 7 has already passed the most upstream border 16. Both the time $t_{Bk}$ and the time $t_{Ak}$ are thus in some embodiments negative times, if the corresponding respective item 5 and the empty place 7 both have passed the most upstream border 16.

The method further includes in a step A5 controlling the velocity $v_2$ of the second conveyance path 6 based on a difference between the time $t_{As}$ and a time ($t_{Bk}+\Delta t$), where $\Delta t$ is a predetermined time difference. According to one embodiment the predetermined time difference $\Delta t$ is zero, and the velocity of the second conveyance path 6 is then controlled based on the difference between the time $t_{As}$ and time $t_{Bk}$ solely. According to another embodiment, the predetermined time difference $\Delta t$ has a non-zero value. For example, the predetermined time difference may equal the time it takes for the robot to pick an item 5, to assure that the respective empty place 7 is still within the working area b2 when the picked item 5 should be placed therein. In some embodiments "s" is equal to "k" of a pair and the item 5 of the pair and the empty place 7 of the same pair have the same order number in the running direction in relation to a border 16, 17 respectively, i.e. measured from a border 16, 17, respectively. In other embodiments "s" is not equal to "k" of a pair, and the item 5 of the pair and the empty place 7 of the same pair have not the same order number in the running direction in relation to a border 16, 17, respectively. In one example, step A5 includes controlling the velocity $v_2$ of the second conveyance path 6 such that the difference between the time $t_{As}$ and a time $(t_{Bk}+\Delta t)$ is decreased.

The velocity $v_2$ of the second conveyance path 6 is preferably updated at regular time intervals, e.g. every second, by repeating one or several of the steps A1-A5. Any upstream robot 1 or robots may affect the velocity control with every pick and place they perform, since any upstream picking and placing continuously will modify the pairing of items 5 and empty places 7.

According to one embodiment, the step A5 includes first controlling the velocity of the second conveyance path 6 based on the difference between the time $t_{A1}$ and a time $(t_{B1}+\Delta t)$, and thereafter include controlling the velocity of the second conveyance path 6 based on the difference between the time $t_{A2}$ and a time $(t_{B2}+\Delta t)$. This may continue until a certain number of pairs have been reached, e.g. N pairs, or continuously until there are no more pairs to create. The controlling may include increasing the velocity $v_2$ of the second conveyance path 6 if the time $t_{As}$ is greater than the time $(t_{Bk}+\Delta t)$ for the one of the one or more pair. According to one embodiment, the velocity $v_2$ is increased such that the item 5 and the respective empty place 7 of the one pair arrive essentially simultaneously to the border 16, 17. The method may thus cause empty places 7 to be "pushed" into the working area b2 of the last robot 2 by the incoming items 5 that reach the working area b2 of the last robot 2. If the robot system 11 has capacity to handle the total number of incoming items 5, very few stand-stills of the second conveyance path 6 will occur and new empty places 7 will be provided continuously to the upstream robot 1 or robots, keeping them busy picking and placing without need for waiting on new empty places 7. A stand-still may occur if a stop-function is used to avoid overflow on the second conveyance path 6.

In some embodiments, the plurality of items 5 also includes any item 5 held by the last robot 2. The item 5 is then held by a tool 2C of the last robot 2, e.g. by a gripper. Any gripper held item 5 is then considered to be the next item 5 in turn to cross the downstream border 17, and will be paired with a corresponding empty place 7, e.g. the empty place 7 being the next empty place 7 to cross a border 16, 17. For example, if the last robot 2 is holding an item 5 with its gripper, and optionally there is no other item 5 within the working area b2 of the last robot 2, and the next empty place 7 in turn has not yet reached the border 16, 17, the velocity $v_2$ of the second conveyance path 6 is preferably increased such that the next empty place 7 faster can be filled. In some other embodiments, the plurality of items 5 does not include any item 5 the last robot 2 is holding with its tool 2C.

According to one embodiment, the velocity $v_2$ is increased by setting a predetermined acceleration $a_2$ of the motor of the second conveyance path 6. The second conveyance path controller 6A is then arranged to set the predetermined acceleration $a_2$ of the motor. For example, the second conveyance path 6 may have a maximum velocity of 550 mm/s and an acceleration of up to 500 mm/s$^2$. Each time it is decided by the method that the velocity $v_2$ of the second conveyance path 6 should be increased, the maximum or other predetermined acceleration is set to the motor driving the second conveyance path 6, e.g. 500 mm/s$^2$ at the next time interval. This acceleration is maintained until the maximum velocity of the second conveyance path 6 has been reached, or until the method decides another control instruction to be implemented, e.g. to reduce the velocity $v_2$ of the second conveyance path 6. Each time it is decided by the method that the velocity $v_2$ should be reduced, a maximum or other predetermined deceleration may be set to the motor driving the second conveyance path 6, e.g. —500 mm/s$^2$ at the next time interval. This deceleration is maintained until the second conveyance path 6 has stopped and $v_2$ is zero, or until the method decides another control instruction to be implemented, e.g. to increase the velocity $v_2$ of the second conveyance path 6.

According to another embodiment, the method includes to perform the calculating for up to N pairs starting from the border 16, 17, and if for all the N pairs the time $t_{As}$ is less than the time $(t_{Bk}+\Delta t)$ the controlling includes decreasing the velocity $v_2$ of the second conveyance path 6. According to some embodiments, at least the empty place 7 of each of the N pairs is located upstream the border 16, 17 when the pairs are created and the calculating is performed. In the following two examples will be explained. In the first example the most upstream border 16 is considered. Then, as long as the time $t_{As}$ for the empty place 7 of a pair is less than the time $t_{Bk}+\Delta t$ for the item 5 of the same pair to reach the most upstream border 16, the empty place 7 will reach the second working area b2 sooner than the item 5, and the empty place 7 will then become within reach for the last robot 2. The velocity $v_2$ of the second conveyance path 6 carrying the empty places 7 could now be decreased in order to await an item 5. However, as it is not desired to unnecessarily decrease the velocity $v_2$ as it might decrease the filling rate of the whole system, the comparison is made for up to N pairs in order to make a better assessment as to whether decreasing the velocity $v_2$ is appropriate. If for all the N pairs the time $t_{As}$ is less than the time $t_{Bk}+\Delta t$, then the velocity $v_2$ will be decreased to finally await items 5. If another pair instead is found where the time $t_{As}$ for the empty place 7 of a pair is greater than the time $t_{Bk}+\Delta t$, then the velocity $v_2$ will be increased. In the second example, the most downstream border 17 is considered. Then only items 5 and empty places 7 upstream the most downstream border 17 are considered. Then, as long as the time $t_{As}$ for the empty place 7 of a pair is less than the time $t_{Bk}+\Delta t$ for the item 5 of the same pair to reach the most downstream border 17, the empty place 7 will presumptively reach the most downstream borders 17 sooner than the item 5. The velocity $v_2$ of the second conveyance path 6 carrying the empty places 7 could now be decreased in order to await an item 5. However, as the last robot 2 most often is programmed to pick the last item 5 and place in the last empty place 7, the last empty place 7 will anyway be placed if there is an item 5 within reach for the last robot 2, and there may thus be no need to decrease the velocity $v_2$ of the second conveyance path 6. Thus, as it is not desired to unnecessarily decrease the velocity $v_2$ as it might decrease the filling rate of the whole system, the comparison is made for up to N pairs in order to make a better assessment as to whether decreasing the velocity $v_2$ is appropriate. If for all the N pairs the time $t_{As}$ is less than the time $t_{Bk}+\Delta t$, then the velocity $v_2$ will be decreased to finally await items 5. If another pair instead is found where the time $t_{As}$ for the empty place 7 of a pair is greater than the time $t_{Bk}+\Delta t$, then the velocity $v_2$ will be increased. A security stop may be used to stop the second conveyance path 6 if there is a risk that an empty place 7 will not be filled before leaving the second working area b2.

According to one embodiment, the N pairs starting from the border 16, 17 consist of N consecutive items 5 and empty places 7 starting from the border 16, 17. Then the order number s for the items 5 are consecutive and equal to the order numbers k for the empty places 7 of a pair (s, k). In some other embodiments, the N pairs do not consist of consecutive items 5 and empty places 7 starting from the border. For example, every second item 5 and every second empty place 7 may be considered. This may be useful for example if the robot shall pick two items 5 at once and place them both directly at a group of two empty places 7. Then, only pairs 1, 3, 5 . . . etc. have to be considered by the method. However, s is still equal to k of a pair (s, k).

According to another embodiment, s is not equal to k of a pair (s, k). For example, k may be equal to a multiple of s, e.g. 2*k, 3*k etc. Alternatively, s may be equal to a multiple of k, e.g. 2*s, 3*s etc. This may be useful for example if the robot 2 for some reason should skip some items 5 or empty spaces 7. For example, if another robot is working along the same first conveyance path 4 and downstream the robot 2, and places to another conveyor path with empty places 7. Then, that robot could use the overflow of items 5 from the robot 2 to place in the other empty places 7.

The number N depends on the velocities of the first conveyance path 4 and the second conveyance path 6, the number of items 5 on the first conveyance path 4, the capability of the last robot 2, e.g. the maximum picking rate of the last robot 2 etc. The number N could for example be any number of 1, 2, 3, 4, 5, 6, 7, 8, 9, 10 . . . 50. When more pairs are considered, the system 11 will respond quicker to upstream unbalances between items 5 and empty places 7. If the system 11 responds too quickly there may be an increased risk to trigger a stop function (described in the following section) of the second conveyance path 2 too often, causing stand stills that leads to unbalances between the flow of items 5 and the flow of empty places 7.

To avoid having an overflow of empty places 7, the method may include a stop function. The stop function includes comparing a characteristic of the empty place 7 of a pair with a limit for the characteristic indicating when the second conveyance path 6 at latest can be stopped such that the empty place 7 is still within the working area b2 of the robot 2. If the characteristic of the empty place 7 is less or equal to the characteristic limit, the controlling includes stopping or reducing the velocity of the second conveyance path 6. The characteristic may be any of the time $t_{As}$ to the most downstream border 17 or a distance for the empty place 7 to the most downstream border 17. The limit may be a braking time or braking distance needed to stop the second conveyance path 6 based on e.g. the velocity $v_2$. The empty place 7 of a pair whose characteristic is being compared with a limit may be the next empty place 7 in turn to leave the working area b2 of the last robot 2. However, if any of the empty places 7 is in the risk zone of not being filled before leaving the working area b2, the second conveyance path 6 should be stopped in time such that the empty place 7 can be filled before leaving the working area b2. The stop function will thus stop the second conveyance path 6 as late as possible, to avoid unnecessary stand stills.

According to a further embodiment, the method includes determining a number of empty places 7 and a number of items 5 within the working area b2 of the last robot 2, and increasing the velocity $v_2$ of the second conveyance path 6 if the number of items 5 is greater than the number of empty places 7. The overflow of items 5 from the last robot 2 may then be decreased, and the efficiency of the system 11 may be increased. In some embodiments, the number of items 5 also includes any item 5 held by the last robot 2, thus held by a gripper of the last robot 2.

If no pair of an item 5 and an empty place 7 is available, e.g. when ramping up production, the second conveyance path 6 may run e.g. with a nominal velocity. If multiple second conveyance paths 6 with empty places 7 are used with one first conveyance path 4 with items 5, the method can be used to control the velocities of all these second conveyance paths 4 by dividing the incoming items 5 between the second conveyance paths 6. The creating of pairs in the method may then include to create pairs with empty places 7 and items 5 separately and independently for each second conveyance path 6.

In addition to controlling the velocity $v_2$ of the second conveyance path 6 or paths, also the velocity $v_1$ of the first conveyance path 4 may be controlled. Thus, the relative velocity between the first conveyance path 4 and the second conveyance path 6 may be controlled. However it is most common that it is only the velocity $v_2$ of the second conveyance path 6 that is controlled, and the first conveyance path 4 is driven with a constant velocity $v_1$. If the velocity $v_1$ of the first conveyance path 4 anyway is changed, the method will adapt fast to the velocity change of the first conveyance path 4.

When starting feeding items 5 on the first conveyance path 4 and empty places 7 on the second conveyance path 6 and thus ramping in a flow of items 5 and a flow of empty places 7, it can be advantageous to let the first pair of items 5 and the empty places 7 in the running direction enter the system at essentially the same time. The first pair will then be made available in the working area b1 of the upstream robot 1 at essentially the same time, thus the incoming flows to the last robot 2 will become reduced significantly by the previous robot 1 or robots, and decreases the risk for an initial overflow of the first conveyance path 4.

When stopping feeding items 5 and empty places 7 and thus ramping out the flow of items 5 and the flow of empty places 7, the ramping out may be performed by stop feeding in new empty places 7 when a matching number of empty places 7 have been fed in that matches all expected items 5. The method will try to match all remaining items 5 and empty places 7 latest at the last robot 2.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method for controlling a velocity of a conveyance path of a system including an industrial robot, a first conveyance path configured to transfer items within a working area (b2) of the robot with a velocity $v_1$, and a second conveyance path configured to transfer empty places within the working area (b2) of the robot with a velocity $v_2$; wherein the method includes:
    obtaining position data for a plurality of items transferred on the first conveyance path;
    obtaining position data for a plurality of empty places transferred on the second conveyance path;

creating one or more pairs including one of the empty places of the plurality of empty places and a respective item of the plurality of items;

calculating, for one of the one or more pairs, a time $t_{As}$ for the empty place of the one pair and a time $T_{Bk}$ for the item of the one pair to reach a border of the working area (b2) based on position data for the one pair and on the velocities $v_1$ and $v_2$; and controlling the velocity $v_2$ of the second conveyance path based on a difference between the time $t_{As}$ and a time $(t_{Bk}+\Delta t)$, where $\Delta t$ is a predetermined time difference.

2. The method according to claim 1, wherein the creating one or more pairs include creating one or more pairs including one of the empty places and a respective item having the same order number in the running direction in relation to the border based on the position data.

3. The method according to claim 1, wherein the controlling includes increasing the velocity $v_2$ of the second conveyance path if the time $t_{As}$, is greater than the time $(t_{Bk}+\Delta t)$ for the one pair.

4. The method according to claim 1, wherein the method includes to perform said calculating for up to N pairs starting from the border, and if for all the N pairs the time $t_{As}$ is less than the time $(t_{Bk}+\Delta t)$, the controlling includes decreasing the velocity $v_2$ of the second conveyance path.

5. The method according to claim 4, wherein the N pairs starting from the border are N consecutive pairs starting from the border.

6. The method according to claim 1, wherein the border of the working area (b2) is the most upstream border that crosses the first conveyance path and the second conveyance path.

7. The method according to claim 1, wherein the border of the working area (b2) is a most downstream border that crosses the first conveyance path and the second conveyance path.

8. The method according to claim 1, including comparing a characteristic of the empty place of a pair with a limit for the characteristic indicating when the second conveyance path at latest can be stopped such that the empty place still remains within the working area (b2) of the robot, and if the characteristic of the empty place is less or equal to the characteristic limit, the controlling includes stopping or reducing the velocity of the second conveyance path.

9. The method according to claim 8, wherein the characteristic is the time $t_{As}$ to a most downstream border or a distance for the empty place to the most downstream border.

10. The method according to claim 1, wherein the plurality of items also includes any item held by the robot.

11. The method according to claim 1, including determining both a number of empty places and a number of items within the working area (b2) of the robot;

increasing the velocity $v_2$ of the second conveyance path if the number of items is greater than the number of empty places.

12. The method according to claim 11, wherein the number of items also includes any item held by the robot.

13. A system including an industrial robot, a first conveyance path configured to transfer items within a working area (b2) of the robot with a velocity $v_1$, and a second conveyance path configured to transfer empty places within the working area (b2) of the robot with a velocity $v_2$, wherein the first conveyance path and the second conveyance path have the same running direction; the system further includes a control system including a processing circuitry, characterized in that the processing circuitry is configured to execute the method according to claim 1.

14. The system according to claim 13, further including a sensor system arranged to monitor the first conveyance path and the second conveyance path in order to obtain position data.

15. The method according to claim 2, wherein the controlling includes increasing the velocity $v_2$ of the second conveyance path if the time $t_{As}$ is greater than the time $(t_{Bk}+\Delta t)$ for the one pair.

16. The method according to claim 2, wherein the method includes to perform said calculating for up to N pairs starting from the border, and if for all the N pairs the time $t_{As}$ is less than the time $(t_{Bk}+\Delta t)$, the controlling includes decreasing the velocity $v_2$ of the second conveyance path.

17. The method according to claim 2, wherein the border of the working area (b2) is the most upstream border that crosses the first conveyance path and the second conveyance path.

18. The method according to claim 2, wherein the border of the working area (b2) is a most downstream border that crosses the first conveyance path and the second conveyance path.

19. The method according to claim 2, including comparing a characteristic of the empty place of a pair with a limit for the characteristic indicating when the second conveyance path at latest can be stopped such that the empty place still remains within the working area (b2) of the robot, and if the characteristic of the empty place is less or equal to the characteristic limit, the controlling includes stopping or reducing the velocity of the second conveyance path.

* * * * *